Aug. 25, 1925.  
C. LE G. FORTESCUE  
1,551,299  
PHASE BALANCER  
Filed Feb. 19, 1921
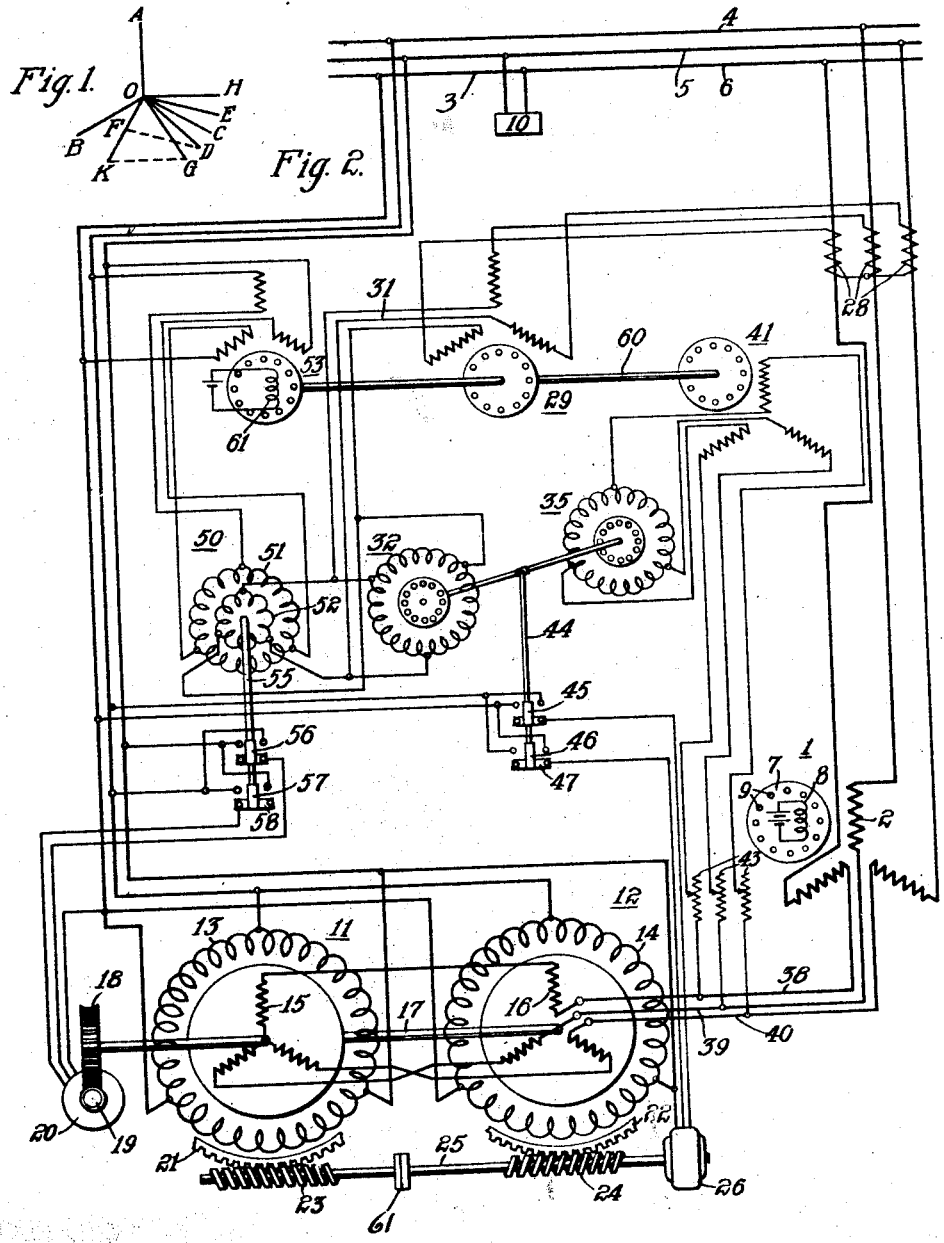
INVENTOR  
Charles LeG.Fortescue  
BY  
Wesley G. Carr  
ATTORNEY
WITNESSES:  
N. T. Shelhamer  
O. B. Buchanan Patented Aug. 25, 1925.

1,551,299

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

PHASE BALANCER.

Application filed February 19, 1921. Serial No. 446,416.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Phase Balancers, of which the following is a specification.

My invention relates to a phase balancer for polyphase transmission systems.

The voltages of a polyphase transmission system often become unbalanced by reason of unbalanced single-phase loads placed on the line. Such unbalancing is very objectionable since it causes very heavy unbalanced currents to circulate through polyphase induction machines connected to the line. Furthermore, when two or more polyphase systems are to be interconnected, it is highly undesirable to interconnect an unbalanced system with one or more balanced systems, since to do so would unbalance all the other systems.

It has heretofore been proposed to employ a synchronous dynamo-electric machine having its primary winding connected in shunt across an unbalanced polyphase system, and having an auxiliary booster connected in series with said primary windings to generate a voltage of the proper phase and magnitude to produce balanced conditions in the polyphase system.

My invention has for its object to devise means for automatically generating the desired booster voltage in a more reliable manner than has heretofore been proposed.

A further object of my invention is to provide a polyphase transforming aggregate for producing a secondary voltage having any desired phase with respect to the primary current, together with means for varying the magnitude of the secondary voltage without varying its phase, and to accomplish all this without the use of taps or auxiliary transformers.

A further object of my invention is to provide means for indicating both the direction and the magnitude of the phase displacement between the symmetrical current and voltage coordinates having the same phase sequence in any given phase system. The symmetrical coordinates herein referred to are described in my paper, entitled "Method of symmetrical coordinates applied to the solution of polyphase networks", published in the Proceedings of the American Institute of Electrical Engineers, June 28, 1918, wherein it was pointed out that, in unbalanced polyphase systems, the quantities may be resolved into a number of balanced or symmetrical components. That is, an unbalanced three-phase system may be resolved into two symmetrical components, one of positive phase-sequence and the other of opposite phase-sequence.

Other objects of my invention will be apparent from the following description and claims which are appended hereto.

Referring to the accompanying drawing, Figure 1 is a vector diagram illustrative of the operation of my induction-regulator aggregate, and Fig. 2 is a diagrammatic view of apparatus and circuits embodying my invention in one of its preferred forms.

According to my invention, as illustrated in the drawings, a synchronous dynamo-electric machine 1 has a primary winding 2, which is connected in shunt across a polyphase system 3, comprising conductors 4, 5, 6. The synchronous machine 1 has a secondary member 7, which may be provided with a unidirectional-current winding 8, as shown, or may be driven at substantially synchronous speed by a separate motor (not shown). It is also provided with a damper winding 9.

Assuming that the unbalanced conditions in the polyphase system 3 are caused by a single-phase load 10, connected across phase-conductors 5 and 6, the voltage in phase 5—6 will be lower than the voltage in either of the other two phases. The machine 1, therefore, tends to operate as a motor on phases 4—5 and 4—6 and as a generator on phase 5—6 in such manner as to restore balanced conditions to the line. Owing to the impedance of the synchronous machine 1, however, there will be a certain impedance-drop in each of the two motor phases and a similar drop in the generator phase, except that the last mentioned drop will be in the opposite direction, owing to the difference in the flow of the current. It is thus apparent that the impedance drops are unsymmetrical, and, hence, the synchronous machine 1, by itself, cannot produce perfectly balanced terminal voltages.

Looking at the subject from the standpoint of symmetrical coordinates, it is observed that the unbalanced polyphase system 3 may be considered as comprising two balanced or symmetrical systems, one having forward or positive phase-sequence, and the other having backward or negative phase-sequence. The machine 1 operates at practically zero slip, with respect to the forward-phase-sequence currents, and draws little or no current of this phase-sequence.

As to the backward-phase-sequence components, however, the machine 1 is rotating at 200 per cent slip, and it offers very small impedance to the flow of backward-sequence-currents. It is to overcome this small impedance that it is necessary to introduce symmetrical voltages of backward phase-sequence into the circuits of the primary windings.

According to my invention, I produce the necessary booster voltage, for overcoming the impedance of the machine 1 to backward-phase-sequence currents, by means of two polyphase induction regulators 11 and 12, comprising primary windings 13 and 14 and secondary windings 15 and 16, respectively. The primary windings 13 and 14 produce substantially sinusoidal fields rotating at synchronous speed. The rotating fields induce, in the secondary windings, polyphase voltages having the same frequency as the supply system, and having a phase displacement, with respect to the primary currents, which is dependent upon the positions of said secondary windings with respect to their primary windings.

The secondary windings 15 and 16 are shown as being mounted upon a common shaft 17, which is adjusted in position by means of worm gearing 18 and 19, and a motor 20. The secondary windings are shown as being connected in opposition. When the secondary voltages are in exact phase-opposition with each other, there will be no resultant voltage; but when the relative phases of the secondary voltages are altered, there will be a resultant voltage which is dependent upon the degree of phase-displacement.

The primary windings 13 and 14 of the induction-regulator aggregate are shown as being mounted upon cradles 21 and 22, which are adapted to be rotated in opposite directions by worms 23 and 24 keyed to a shaft 25, which is adapted to be driven in either direction by a motor 26.

I have indicated the primary windings 13 and 14 as being shifted in opposite directions, for a reason which will be apparent from Fig. 1. Here, I have shown, at A, B and C, the currents induced in each of the secondary windings 15 and 16, when they are in phase with each other. Since the currents flowing through the secondary windings are in opposite directions, the resultant voltage is zero.

If the primary windings moved equal amounts in opposite directions, the secondary voltage OC will shift to OD for the secondary winding 15, and to OE for the secondary winding 16. As the secondary winding 16 is connected in opposition to the secondary winding 15, the voltage OE is plotted as DF, giving the resultant voltage OF. If the primaries are further shifted, so that the secondary voltages become OG and OH, respectively, the resultant voltage becomes OK. It will be observed that the lines OF and OK are coincident, thus indicating that the magnitude of the resultant voltage is changed without changing its phase.

In order to cause the balancing machine 1 to offer zero impedance to the negative-phase-sequence currents, it is necessary to overcome the internal impedance of said machine. This will involve the generation of a negative-phase-sequence voltage having a definite ratio to the negative-phase-sequence current and a definite phase-displacement relative thereto.

To secure the desired ratio between current and voltage I provide current transformers 28 in the mains connecting the machine to the polyphase line, and I pass the current of said transformers through a positively rotating series balancer 29, in order to block out the positive-phase-sequence component. I thus obtain an electromotive force which is proportional to the negative-phase-sequence current flowing through the machine 1. The last-mentioned electromotive force is applied, through conductors 31, to the stator of a small induction motor or meter 32, for developing a torque proportional to the negative-phase-sequence currents of the balancer 1.

The shaft of the torque meter 32 is connected to another meter 35, which develops an opposite torque by having its stator connected in proper phase sequence to the terminals 38, 39 and 40 of the induction-regulator aggregate. If desired, a positive-phase-sequence series balancer 41 may be included in series with the meter 35 to block out the small positive-phase-sequence electromotive forces which may be present. An impedance device 43 may also be included in the meter circuit for securing the desired ratio between the backward-phase-sequence currents flowing through the machine 1 and the backward-phase-sequence electromotive forces of the induction regulator.

The common shaft of the meters 32 and 35 carries a pointer 44, which has contact members 45 and 46 for cooperating with stationary contacts, indicated generically at 47, for driving the motor 26 in one direction or the other, in order to adjust the angular positions of the primary windings of the induction regulator aggregate. The adjustment just described varies the terminal voltage of the induction regulators, without varying its phase.

To effect the proper phase-adjustment of the booster electromotive forces produced by the induction-regulator aggregate, I provide a phase indicator 50, consisting of a three-phase stator element 51 and a three-phase rotor element 52. One of the elements, for example, the stator 51, is connected to the polyphase mains 4, 5, 6 through a positively rotating series balancer 53. The other element 52 is energized from the lines 31 which carry electromotive forces proportional to the backward-phase-sequence currents flowing in machine 1, as previously described. By the arrangement just described, two fields rotating in the same direction are set up in the meter 50, and the phase displacement between the two fields may be indicated by means of a pointer 55.

The pointer 55 carries contact members 56 and 57 which co-operate with stationary contacts, indicated generically at 58, for driving the motor 20 in the one or the other direction, in order to adjust the angular position of the secondary members 15 and 16 of the induction regulators 11 and 12. In this manner, the backward-phase-sequence currents in the machine 1 may be maintained in phase with the backward-phase-sequence electromotive forces in the polyphase lines 3. The same result would, of course, be obtained if the primary winding 51 of the meter 50 were connected to the terminals of the meter 35, provided that the pointer 55 were set to lie in neutral position with a certain phase displacement between stator or rotor, dependent upon the ratio of reactance to resistance in the machine 1.

The rotors of the series balancers 29, 41 and 53 may all be mounted on a common shaft 60 which may be synchronously driven by a separate motor (not shown), or may be supplied with the necessary driving torque by one or all of said machines. I have indicated a unidirectional winding 61 on the rotor of the phase balancer 53, whereby the latter will drive the shaft 60 at synchronous speed.

While I have described the adjustment of both of the primary windings 13 and 14 of the induction regulators 11 and 12, to produce the desired control of the magnitude of the resultant electromotive forces, it is to be understood that this control could be effected by the adjustment of only one of said primary windings, as by disengaging a clutch 61 between the worms 23 and 24. In the latter event, however, the phase-angle of the resultant electromotive forces would be changed, and the adjustment of the primary windings would have to be accompanied by a simultaneous adjustment of the secondary windings.

While I have illustrated my invention in its preferred forms, it is to be understood that it is susceptible of various modifications by those skilled in the art and that the claims are to be construed to cover all such modifications except where limited by the state of the art.

I claim as my invention:

1. The combination with a polyphase line subject to unbalanced conditions, of a polyphase dynamo-electric machine having its primary winding connected across said line, an auxiliary source of backward-phase-sequence electromotive forces connected in series with said primary winding, means responsive to the ratio of the backward-phase-sequence-component currents in said machine to the backward-phase-sequence electromotive forces of said auxiliary source for varying said auxiliary electromotive forces in such manner as to maintain said ratio substantially constant, and means responsive to the phase-angle between the backward-phase-sequence-component currents in said machine and the backward-phase-sequence-component electromotive forces in said polyphase line for varying the phase-angle of the electromotve forces of said auxiliary source.

2. The combination with a polyphase line subject to unbalanced conditions, of a polyphase dynamo-electric machine having its primary winding connected across said line, an auxiliary source of backward-phase-sequence electromotive forces connected in series with said primary winding, and means responsive to the ratio of the backward-phase-sequence-component currents in said machine to the backward-phase-sequence electromotive forces of said auxiliary source for varying said auxiliary electromotive forces in such manner as to maintain said ratio substantially constant.

3. The combination with a polyphase line subject to unbalanced conditions, of a polyphase dynamo-electric machine having its primary winding connected across said line, an auxiliary source of backward-phase-sequence electromotive forces connected in series with said primary winding, and means responsive to the phase-angle between the backward-phase-sequence-component currents in said machine and the backward-phase-sequence-component electromotive forces in said polyphase line for varying the phase-angle of the electromotive forces of said auxiliary source.

4. The combination with a polyphase line subject to unbalanced conditions, of a polyphase dynamo-electric machine having its primary winding connected across said line, an auxiliary source of backward-phase-sequence electromotive forces connected in series with said primary winding, means responsive to the ratio of the backward-phase-sequence-component currents in said machine to the backward-phase-sequence electromotive forces of said auxiliary source for varying said auxiliary electromotive forces in such manner as to maintain said ratio substantially constant, and automatic means controlling the phase-angle of said auxiliary electromotive forces for maintaining said auxiliary electromotive forces in substantial phase-opposition to the impedance drops in said machine.

5. An induction-regulator aggregate, comprising two similar polyphase induction regulators, having their secondary windings connected in opposition, means for shifting the relative angular position of one of said primary windings with relation to its secondary winding, and means for simultaneously shifting the relative angular positions of both of said secondary windings with relation to their respective primary windings.

6. An induction-regulator aggregate, comprising two polyphase induction regulators, having their secondary windings connected in opposition, means for simultaneously shifting the relative angular positions of said secondary windings with relation to their respective primary windings, and means for independently varying the phase of the electromotive force in one secondary with respect to the other.

7. An induction-regulator aggregate, comprising two polyphase induction regulators, having their secondary windings normally connected in phase-opposition, and means for displacing said secondary windings from the condition of phase-opposition, whereby a variable resultant electromotive force is produced.

8. An induction-regulator aggregate, comprising two polyphase induction regulators, having their secondary windings connected in opposition, and means for simultaneously varying the phase of the secondary electromotive forces in opposite directions, whereby the resultant electromotive force is varied in magnitude but not in phase.

9. In a polyphase system subject to unbalanced conditions, means for indicating the phase displacement between electromotive forces of one-phase sequence and currents of the same phase-sequence, comprising a phase indicator having stator and rotor elements, one of said elements being connected across said polyphase system through a series balancer of the induction-motor type, and the other of said elements being connected in series with said polyphase system through a similar series balancer, said balancers rotating in the same direction so as to offer a synchronous impedance to currents of the undesired phase-sequence.

10. A differential relay for indicating variations from a given ratio between component currents of a given phase-sequence and component electromotive forces of the same phase-sequence in a polyphase line, said relay comprising two oppositely acting torque-meters, connected, respectively, in series with said polyphase line and in shunt across a given portion of the same, and a series balancer of the induction-motor type connected in series with each of said meters for blocking out currents of the undesired phase-sequence.

11. The combination with a polyphase system subject to unbalanced conditions, of a differential relay for responding to variations from a given ratio between component currents of a given phase-sequence and component electromotive forces of the same phase-sequence, said relay comprising two oppositely acting torque-meters, connected, respectively, in series with said polyphase line and in shunt across a given portion of the same, and means whereby currents of only said given phase-sequence are permitted to flow through said meters.

12. The combination with a polyphase line subject to unbalanced conditions, of a polyphase dynamo-electric machine having its primary winding connected across said line, an auxiliary source of backward-phase-sequence electromotive forces connected in series with said primary winding, and means responsive to the backward-phase-sequence component currents in said machine for varying said auxiliary electromotive forces in such manner as to maintain said electromotive forces as nearly as possible proportional to said component currents.

13. In a phase-balancing system, the combination with a shunt balancer, of a negative-phase-sequence induction regulator connected in series therewith.

14. In a phase-balancing system, the combination with a shunt balancer, of an induction-regulator aggregate connected in series with said balancer to supply negative phase-sequence component electromotive forces thereto, and means for varying the phase and magnitude of said electromotive forces.

15. In a phase-balancing system, the combination with a polyphase line subject to unbalanced conditions, of a shunt-connected balancing device offering a relatively high impedance to symmetrical polyphase currents of one phase-sequence and a relatively low impedance to symmetrical polyphase currents of another phase-sequence, and an induction regulator having said last-mentioned phase-sequence and connected in series with said balancing device.

16. In a phase-balancing system, the combination with a polyphase line subject to unbalanced conditions, of a shunt-connected balancing device offering a relatively high impedance to symmetrical polyphase currents of one phase-sequence and a relatively low impedance to symmetrical polyphase currents of another phase-sequence, an induction-regulator aggregate connected in series with said balancing device to supply electromotive forces of the last-mentioned phase-sequence, and means for varying the phase and magnitude of said electromotive forces, whereby said relatively low impedance may be substantially neutralized.

17. In a phase-balancing system, the combination with a polyphase line subject to unbalanced conditions, of a shunt-connected balancing device offering an impedance to negative-phase-sequence currents, and induction-regulator aggregate connected in series with said balancing device to supply negative-phase-sequence electromotive forces thereto, and means for varying the phase and magnitude of said electromotive forces, whereby said impedance to negative-phase-sequence currents may be substantially neutralized.

18. The combination with a polyphase line subject to unbalanced conditions of a light-running shunt-connected balancing device offering different impedances to symmetrical polyphase currents of two different phase-sequences, and an induction regulator connected in series with said balancing device in such phase-sequence as to assist the flow of balancing currents in said device.

19. The combination with a polyphase line subject to unbalanced conditions, of a shunt-connected balancing device offering an impedance to symmetrical polyphase currents of two different phase-sequences, an indication-regulator aggregated connected in series with said balancing device to supply electromotive forces of one of said phase-sequences, and means for varying the phase and magnitude of said electromotive forces, whereby the impedance of said balancing device to currents of said last-mentioned phase-sequence may be substantially neutralized.

20. An induction-regulator aggregated, comprising two similar polyphase induction regulators, having their secondary windings connected in opposition, means for simultaneously shifting the angular positions of the primary fields in opposite directions, a common shaft associated with said secondary windings, and means for shifting the angular position of said shaft.

21. An induction-regulator aggregate, comprising two polyphase induction regulators, having their secondary windings connected in series, and means for varying the relative positions of the primary and secondary windings of each regulator, whereby resultant secondary electromotive forces of variable phase and magnitude may be obtained.

22. An induction-regulator aggregate, comprising two poylphase induction regulators, having their secondary windings mechanically and electrically connected, and means for simultaneously shifting the angular positions of said mechanically connected windings, whereby the resultant electromotive force is varied in phase but not in magnitude.

23. An induction-regulator aggregate, comprising two polyphase induction regulators, having their secondary windings mechanically and electrically connected, and means for simultaneously shifting the angular positions of the primary fields in opposite directions, whereby the resultant electromotive force is varied in magnitude but not in phase.

24. An induction-regulator aggregate, comprising two similar polyphase induction regulators, having their secondary windings connected in opposition, means for shifting the angular positions of the primary field, a common shaft associated with said secondary windings, and means for shifting the angular position of said shaft.

25. An induction-regulator aggregate, comprising two polyphase induction regulators, having their secondary windings mechanically and electrically connected, and means for shifting the angular positions of the primary fields.

26. In combination, an alternating-current circuit and voltage-regulating means therefor comprising a plurality of induction regulators having interconnected windings and independently rotatable rotors so that voltages varying in magnitude and phase are produced in said circuit by varying the relative positions of the rotors of said induction regulators.

27. In combination, a polyphase circuit and voltage-regulating means therefor comprising a polyphase induction regulator connected in said circuit, and a second induction regulator having its primary winding excited from said circuit and its secondary winding connected to a winding of said polyphase induction regulator so that the resultant voltages produced in one phase of said polyphase circuit by varying the relative positions of the rotors of said induction regulators vary in magnitude and phase.

In testimony whereof, I have hereunto subscribed my name this 15th day of February 1921.

CHARLES LE G. FORTESCUE.